US012122693B2

(12) United States Patent
Hanna (10) Patent No.: US 12,122,693 B2
(45) Date of Patent: Oct. 22, 2024

(54) FLUID REACTION TANK AND METHOD FOR USING SAME

(71) Applicant: Clearflow Group Inc., Sherwood Park (CA)

(72) Inventor: Gerald Hanna, Sherwood Park (CA)

(73) Assignee: Clearflow Group Inc., Sherwood Park (CA)

( * ) Notice: Subject to any disclaimer, the term of this patent is extended or adjusted under 35 U.S.C. 154(b) by 415 days.

(21) Appl. No.: 17/257,568

(22) PCT Filed: Jul. 4, 2019

(86) PCT No.: PCT/CA2019/050920
§ 371 (c)(1),
(2) Date: Jan. 1, 2021

(87) PCT Pub. No.: WO2020/006635
PCT Pub. Date: Jan. 9, 2020

(65) Prior Publication Data
US 2021/0276895 A1    Sep. 9, 2021

Related U.S. Application Data

(60) Provisional application No. 62/693,912, filed on Jul. 4, 2018.

(51) Int. Cl.
*C02F 1/52*        (2023.01)
*C02F 1/56*        (2023.01)
(Continued)

(52) U.S. Cl.
CPC .......... *C02F 1/5281* (2013.01); *C02F 1/5245* (2013.01); *C02F 1/56* (2013.01);
(Continued)

(58) Field of Classification Search
None
See application file for complete search history.

(56) References Cited

U.S. PATENT DOCUMENTS

| 2,907,174 | A | | 10/1959 | Hendal | |
|---|---|---|---|---|---|
| 6,780,310 | B1 | * | 8/2004 | Howe | ................ B01D 17/0217 |
| | | | | | 210/170.03 |

(Continued)

FOREIGN PATENT DOCUMENTS

| CA | 2824338 A1 | | 7/2012 | | |
|---|---|---|---|---|---|
| CN | 107823960 A | * | 3/2018 | ............. | B01D 36/04 |
| KR | 20110102648 A | * | 9/2011 | ................ | C02F 1/00 |

OTHER PUBLICATIONS

Machine translation for CN 107823960 (Year: 2018).*
(Continued)

*Primary Examiner* — Peter Keyworth
(74) *Attorney, Agent, or Firm* — FOLEY & LARDNER LLP (57) ABSTRACT

A fluid reaction tank is provided having an inlet vortex tube for receiving fluid having suspended solids therein and to impart a vortex motion on the fluid flowing therethrough into a reactor housing having one or more cartridges containing a flocculant composition. The cartridges can have perforated inner sidewalls to allow contact of fluid with the composition. The cartridges can further have vortex forming ridges therein to impart or to maintain the vortex motion of the fluid flowing through the fluid reaction tank.

24 Claims, 3 Drawing Sheets

(51) Int. Cl.
    *C02F 1/68*           (2023.01)
    *C02F 103/00*        (2006.01)
    *C02F 103/10*        (2006.01)

(52) U.S. Cl.
    CPC ........ *C02F 1/688* (2013.01); *C02F 2103/001* (2013.01); *C02F 2103/10* (2013.01); *C02F 2201/006* (2013.01); *C02F 2301/026* (2013.01)

(56) References Cited

U.S. PATENT DOCUMENTS

| | | | | |
|---|---|---|---|---|
| 2004/0069716 A1* | 4/2004 | Morse | ................ | B01F 25/3141 |
| | | | | 205/742 |
| 2013/0292342 A1* | 11/2013 | Hanna | .................... | B01D 21/01 |
| | | | | 210/738 |
| 2014/0199178 A1* | 7/2014 | Perez | .................... | B01D 35/26 |
| | | | | 415/121.2 |

OTHER PUBLICATIONS

Machine translation for KR 10-2011-0202648 (Year: 2011).*
International Search Report and Written Opinion on PT App. PCT/CA2019/050920 dated Aug. 28, 2019 (9 pages).
International Preliminary Report on Patentability for PCT App. PCT/CA2019/050920 dated Jan. 5, 2021 (6 pages).

* cited by examiner

FLUID REACTION TANK AND METHOD FOR USING SAME

CROSS-REFERENCE TO RELATED APPLICATIONS

This application is a U.S. National Phase application of International Application No. PCT/CA2019/050920 filed Jul. 4, 2019, which claims priority of U.S. provisional patent application Ser. No. 62/693,912 filed Jul. 4, 2018, which is incorporated by reference into this application in its entirety.

TECHNICAL FIELD

The present disclosure is related to the field of compositions used for flocculating or settling solids suspended in liquids, the methods used in manufacturing such composition, and the use of such compositions in reactors for flocculating solids suspended in liquids. The present disclosure is further related to the field of systems and methods used in the treatment of water, in particular, systems and methods used in the treatment and clarification of wastewater, sewage or industrial effluent to remove suspended solids therefrom.

BACKGROUND

Water and liquids used in construction, industrial, mining and well drilling operations can contain suspended solids after being used. In some instances, governmental laws and regulations can require that the removal of the suspended solids must be carried out before the water or liquids can be introduced into the environment. In other instances, the recovery of the liquids, once the solids have been removed, can reduce the costs of the operation by re-using the liquids instead of discarding the liquids and using new or fresh liquids at a higher cost.

Wasterwater and sewage can contain suspended solids. In some instances, governmental laws and regulations can require that the removal of the suspended solids must be carried out before the water or liquids can be introduced into the environment. In other instances, the recovery of the liquids, once the solids have been removed, can reduce the costs of the operation by re-using the liquids instead of discarding the liquids and using new or fresh liquids at a higher cost.

U.S. Pat. No. 3,085,916 issued to Zimmie et al. on Apr. 16, 1963, which is incorporated by reference into this application in its entirety, describes a method of flocculating and preventing the accumulation of solids or silt in cooling systems by introducing water-soluable polyelectrolytic organic polymers into aqueous cooling systems.

U.S. Pat. No. 3,860,526 issued to Corbett on Jan. 14, 1975, which is incorporated by reference into this application in its entirety, describes a solid flocculant that can be placed into an effluent stream or body of water to release flocculant into the stream or water at a controlled rate.

U.S. Pat. No. 5,720,886 issued to Iwinski on Feb. 24, 1998, which is incorporated by reference into this application in its entirety, describes a process for using polymer to remove dissolved and particulate metal from mine wasterwater.

U.S. Pat. No. 5,795,620 issued to Iwinski on Aug. 18, 1998, which is incorporated by reference into this application in its entirety, describes the coating of waste rock with polymer to retard the leaching of metal from the waste rock.

The shortcomings of the prior art are that they do not provide a cost-effective and efficient method of flocculating or settling of solids suspended in liquids. In addition, the prior art concerning wasterwater treatment systems does not provide a cost-effective and efficient method of flocculating or settling of solids suspended in liquids, as these prior art methods and systems can take 2 to 5 weeks to clarify water using microbial reactions.

It is, therefore, desirable to provide a composition and a method of using the composition that overcomes the shortcomings of the prior art, and to provide a system and a method of treating water and, in some embodiments, sewage that overcomes the shortcomings of the prior art.

SUMMARY

A composition for flocculating or settling solids suspended in liquids is provided. In some embodiments, the composition can comprise a polymer, a soluble salt of a group IA metal or a soluble salt of a group IIA metal of the periodic table, and water. In other embodiments, the soluble salt of a group IA metal or the soluble salt of a group IIA metal can be formed by combining a salt of a group IA metal or a salt of a group IIA metal with a mineral acid or an organic acid.

In some embodiments, the composition can be manufactured by first combining the polymer and the alkaline earth metal soluble salt, and then adding the water.

In some embodiments, the composition can comprise the composition as described in Canadian patent no. 2824338 and U.S. Pat. No. 9,944,547, which are both incorporated by reference into this application in their entirety.

In some embodiments, a cartridge can be provided for use in flocculating or settling solids suspended in liquids. The cartridge can comprise an outer sidewall and inner sidewall wherein the composition can be disposed therebetween. The inner sidewall can further comprise perforations wherein liquids flowing through the cartridge can contact the composition through the perforations and cause the composition to dissolve and enter into the liquids.

In some embodiments, a fluid reactor tank can be provided for flocculating or settling solids suspended in liquids. The fluid reactor tank can comprise a vortex tube for receiving a flow of fluid and to impart a vortex motion, via vortex forming ridges disposed therein, on the flowing fluid prior to entering a reactor housing configured to house one or more cartridges comprising the composition described above. The diameter of the reactor house and the cartridges can be selected so that the fluid reaction tank can comprise a uniform internal diameter therein from the inlet of the vortex tube to the outlet of the reactor housing. The inner sidewalls of the cartridges can be perforated so that fluid flowing therethrough can contact the flocculant composition through the perforations to help settle suspended solids in the fluid. When fluid passes through the vortex tube, the fluid flow can acquire a vortex motion, which can assist in increasing the contact of fluid with the flocculant composition in the cartridges.

In some embodiments, one or more of the cartridges can also comprise vortex forming ridges disposed therein to maintain or to continue the vortex motion of the fluid flowing therethrough to increase the contact between the fluid and the flocculant composition, thereby increasing the amount of dissolved flocculant composition into the fluid with the objective of decreasing the amount of time to settle suspended solids in the fluids, or to increase the amount of fluid that can be handled by the fluid reaction tank, or both.

Broadly stated, in some embodiments, a fluid reaction tank can be provided, the fluid reaction tank comprising: a fluid reaction tank, comprising: a vortex tube comprising a first end and a second end, the first end comprising an inlet thereto, the vortex tube defining a first passageway disposed along a first longitudinal axis therethrough between the first end and the second end and providing communication between the first and second ends, the vortex tube configured to impart a vortex motion on fluid flowing therethrough from the first end to the second end; a reactor housing comprising a third end and a fourth end, the reactor housing defining a reactor chamber providing communication between the third and fourth ends, the third end operatively coupled to the second end of the vortex tube, the fourth end defining an outlet therefrom; and at least one reactor cartridge disposed within the reactor chamber, the at least one reactor cartridge comprising an outer sidewall and an inner perforated sidewall, the at least one reactor cartridge comprising a second passageway extending therethrough, the at least one reactor cartridge comprising a composition disposed between the outer and inner sidewalls wherein the perforated sidewall is configured for the fluid to contact the composition, the composition comprising: a polymer flocculant comprising a high molecular weight, in a proportion of approximately 10% to 70% by weight, a soluble salt of a group IA metal or a soluble salt of a group IIA metal, in a proportion of approximately 0.5% to 35% by weight, and water, in a proportion to make up the balance of 100% weight.

Broadly stated, in some embodiments, a method can be provided for treating fluid to remove suspended solids therefrom, the method comprising passing the fluid through a fluid reaction tank, the fluid reaction tank comprising: a vortex tube comprising a first end and a second end, the first end comprising an inlet thereto, the vortex tube defining a first passageway disposed along a first longitudinal axis therethrough between the first end and the second end and providing communication between the first and second ends, the vortex tube configured to impart a vortex motion on fluid flowing therethrough from the first end to the second end; a reactor housing comprising a third end and a fourth end, the reactor housing defining a reactor chamber providing communication between the third and fourth ends, the third end operatively coupled to the second end of the vortex tube, the fourth end defining an outlet therefrom; and at least one reactor cartridge disposed within the reactor chamber, the at least one reactor cartridge comprising an outer sidewall and an inner perforated sidewall, the at least one reactor cartridge comprising a second passageway extending therethrough, the at least one reactor cartridge comprising a composition disposed between the outer and inner sidewalls wherein the perforated sidewall is configured for the fluid to contact the composition, the composition comprising: a polymer flocculant comprising a high molecular weight, in a proportion of approximately 10% to 70% by weight, a soluble salt of a group IA metal or a soluble salt of a group IIA metal, in a proportion of approximately 0.5% to 35% by weight, and water, in a proportion to make up the balance of 100% weight.

Broadly stated, in some embodiments, the composition can be solid or gelatinous.

Broadly stated, in some embodiments, the soluble salt can be a combination of a salt of the group IA metal or a salt of the group IIA metal and an organic acid or a mineral acid.

Broadly stated, in some embodiments, the vortex tube can be cylindrical.

Broadly stated, in some embodiments, the vortex tube can further comprise at least one first vortex forming ridge disposed within the first passageway, wherein fluid entering the inlet and flowing through the first passageway exits the second end of the vortex tube in a vortex motion.

Broadly stated, in some embodiments, one or more of the first end, the second end, the third end and the fourth end can comprise a mounting flange.

Broadly stated, in some embodiments, each of the second and third ends comprises one of the mounting flange, and wherein the second end can be coupled to the third end via fasteners joining the mounting flanges together.

Broadly stated, in some embodiments, each of the outer sidewall and the inner sidewall of the at least one reactor cartridge can be cylindrical, and wherein the composition can be disposed between the outer and inner sidewalls.

Broadly stated, in some embodiments, the at least one reactor cartridge can comprise at least one end wall coupling the outer sidewall to the inner sidewall.

Broadly stated, in some embodiments, the at least one reactor cartridge can further comprise at least one second vortex forming ridge can be disposed within the second passageway, wherein fluid entering the third end and flowing through the second passageway can exit the outlet in a vortex motion.

Broadly stated, in some embodiments, the reactor housing can be cylindrical, and the vortex tube can be cylindrical.

Broadly stated, in some embodiments, the reactor housing can be larger than the vortex tube.

Broadly stated, in some embodiments, a plurality of the at least one reactor cartridge can be disposed in the reactor chamber.

Broadly stated, in some embodiments, one or both of the inlet and the outlet can comprise pipe coupling threads.

Broadly stated, in some embodiments, one or both of the vortex tube and the reactor housing can further comprise one or more injection ports for injecting chemicals therein.

Broadly stated, in some embodiments, the reactor housing can further comprise one or both of lifting hooks and forklift straps disposed thereon.

DETAILED DESCRIPTION OF EMBODIMENTS

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

In some embodiments, a fluid reaction tank comprising one or more cartridges disposed therein is provided for flocculating or settling solids suspended in liquids. Each cartridge comprises a composition for flocculating or settling solids suspended in liquids. The composition can be a flocculant in solid or gelatinous form that can dissolve into liquids. When liquids containing suspended solids contact the composition, the composition can dissolve thereby releasing flocculant into the liquid to contact the suspended solids. The suspended solids, having been contacted with the flocculant, can clump together and then settle from the liquids. When a plurality of cartridges are disposed in the fluid reaction tank, the cartridges can each comprise the same composition or different cartridges can comprise different compositions, depending on the fluids to be treated and the suspended solids contained therein.

In some embodiments, the composition can comprise a polymer or polymeric flocculant, which can further comprise a macromolecular organic component and have a high molecular weight. Suitable examples can include those described in U.S. Pat. Nos. 3,085,916 and 3,860,526, incorporated by reference herein. The proportion of the polymer in the composition can be in the range of approximately 10% to 70% by weight. The composition can further comprise any suitable soluble salt of group IA metal or of a group IIA metal of the periodic table as well known to those skilled in the art, the proportion of which can be in the range of approximately 0.5% to 35% by weight. Examples of suitable soluble salts can include those disclosed in the above-mentioned patents. The balance of the composition can comprise water to make up the 100% weight.

In some embodiments, the soluble salt of group IA metal or of a group IIA metal of the periodic table can be a combination of any suitable salt of a group IA metal or of a group IIA metal of the periodic table as well known to those skilled in the art, such as those metals that appear in columns IA or IIA of the chemical periodic table, as well known to those skilled in the art, with any suitable organic or mineral acid as well known to those skilled in the art. Suitable examples can include sulphuric acid, hydrochloric acid and nitric acid as mineral acids, whereas suitable organic acids can include acetic acid, boric acid, citric acid and formic acid. Other suitable mineral or organic acids can include those described in U.S. Pat. Nos. 3,085,916 and 3,860,526, incorporated by reference herein, the suitable selection of which can obviously be determined by those skilled in the art. The balance of the composition can comprise water to make up the 100% weight.

In some embodiments, the composition can be manufactured by first combining the polymer and the salt of a group IA metal or of a group IIA metal of the periodic table, both of which can be in solid granular or powder form, and then mixing them with the organic or mineral acid and water. In other embodiments, the salt of a group IA metal or of a group IIA metal of the periodic table can be mixed with the acid and water, and then add the polymer to the mixture.

In further embodiments, the composition can be manufactured by first combining the polymer with the soluble salt of a group IA metal or of a group IIA metal of the periodic table, and then adding the balance of water. In yet further embodiments, the composition can be manufactured by first mixing the soluble salt of a group IA metal or of a group IIA metal of the periodic table with the water, and then adding the polymer.

In any of the manufacturing methods described herein, the resultant mixtures of the components of the composition can then react with each other, which can further result in the mixture setting or curing into a solid or gelatinous form. Once the components of the composition have been mixed together, there can be a working time ranging from anywhere from approximately 2 to 10 minutes to affix the shape of the composition after which the shape composition can become set or cured.

In terms of the methods of manufacture relating to whether the last component added to the mixture to form the composition is water or the polymer, it has been observed that the choice of which can result in the polymer being more soluble or less soluble. For example, if the water is the last component added to a mixture of polymer and salt of a group IA metal or of a group IIA metal of the periodic table, it is observed that the resulting composition is less soluble in terms of releasing the polymer. If the polymer is the last component added to a mixture of the soluble salt of a group IA metal or of a group IIA metal of the periodic table, it is observed that the resulting composition is more soluble in terms of releasing the polymer. The choice of manufacture can be made in respect of the application for the composition. If the composition is to be used in a closed-loop system where liquids are re-circulated through the composition, then using a composition whose polymer is less soluble may be preferable to prevent the composition being consumed or dissolved too rapidly. If the composition is to be used in an open-loop system where liquids pass through the composition once, then using a composition whose polymer is more soluble may be preferable to introduce the polymer into the liquids at a predetermined or desired rate.

Figure 1:
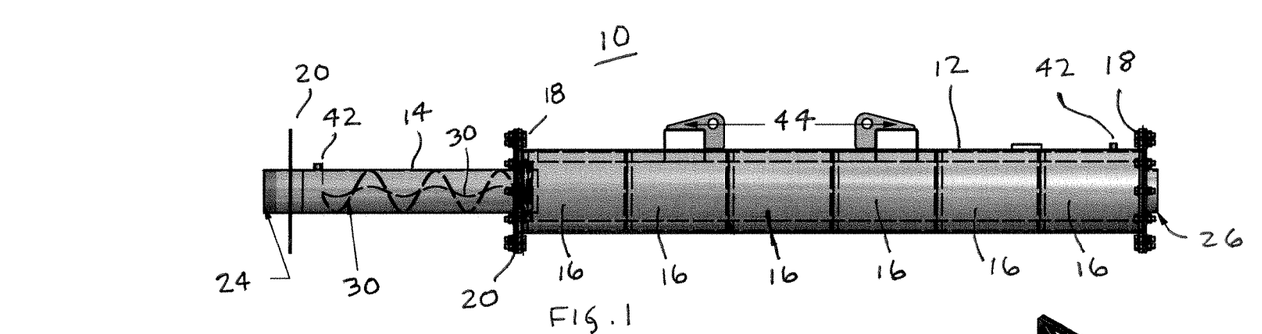
FIG. 1 is a side elevation view depicting one embodiment of a fluid reaction tank.
Figure 2:
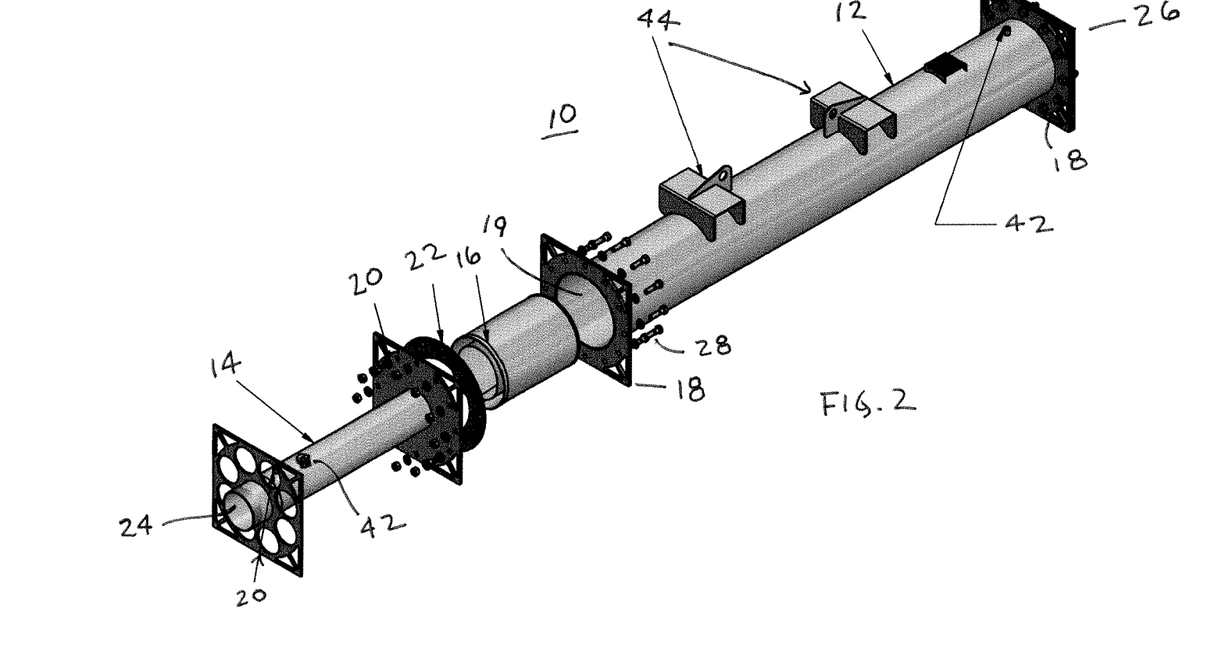
FIG. 2 is an exploded perspective view depicting the fluid reaction tank of FIG. 1.
Figures 3, 4, 5, 6, 7:
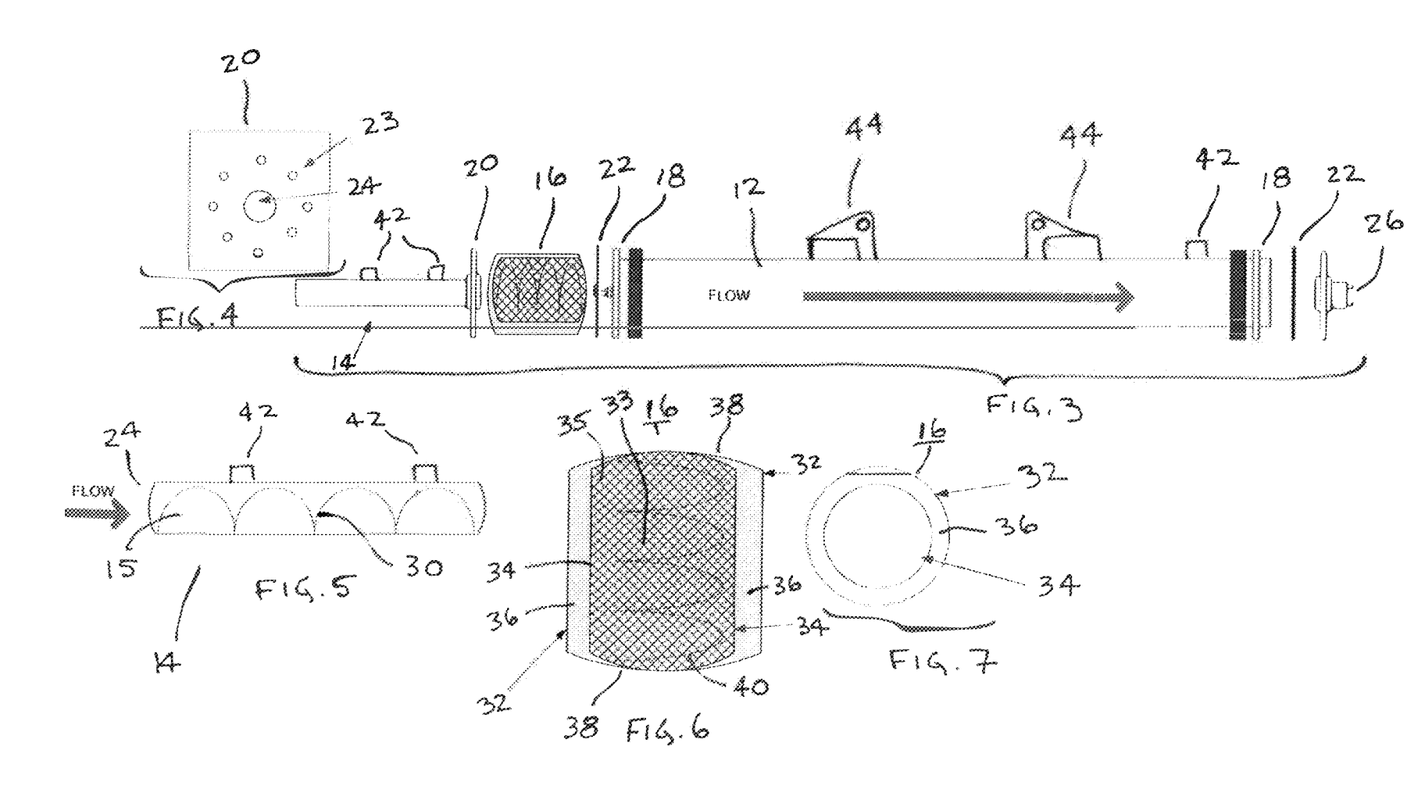
FIG. 3 is an exploded side elevation view depicting another embodiment of a fluid reaction tank.
FIG. 4 is an end view depicting a flange plate for the fluid reaction tank of FIG. 3.
FIG. 5 is a cross-section side elevation view depicting a vortex tube of the fluid reaction tank of FIG. 3.
FIG. 6 is a cross-section side elevation view depicting a cartridge for use with the fluid reaction tank of FIG. 3.
FIG. 7 is a top plan view depicting the cartridge of FIG. 6.

Referring to FIGS. 1 to 9, one embodiment of fluid reaction tank 10 is shown. In some embodiments, fluid reaction tank 10 can comprise vortex tube 14 further comprising a first end and a second end defining passageway 15 therebetween as shown in FIG. 5. In some embodiments, the first end can comprise inlet 24 that can further comprise pipe coupling threads. In a representative embodiment, inlet 24 can comprise male national pipe threads (MNPT) of a standard pipe size as well known to those skilled in the art, to enable the coupling of fluid reaction tank 10 to other fluid processing equipment. In a representative embodiment, outlet 26 can comprise female national pipe threads (FNPT) of a standard pipe size as well known to those skilled in the art, to enable the coupling of fluid reaction tank 10 to other fluid processing equipment.

In some embodiments, fluid reaction tank 10 can comprise reactor housing 12 that can comprise third and fourth ends defining reactor chamber 19 therebetween. In some embodiments, reactor housing 12 can be operatively coupled to vortex tube 14. In some embodiments, one or both of vortex tube 14 and reactor housing 12 can comprise flanges 20 and 18, respectively, to enable the coupling of vortex tube 14 to reactor housing 12 via threaded fasteners 28 placed through openings 23 disposed in the flanges. In some embodiments, gasket 22 can be placed between flanges 18 and 20 prior to their being coupled together to seal the connection therebetween. In some embodiments, one or both of vortex tube 14 and reactor housing 12 can be cylindrical in configuration. In further embodiments, reactor housing 12 can be larger in diameter than vortex tube 14. In a representative embodiment, vortex tube 14 can be 6 inches (~150 mm) in diameter whereas reactor housing 12 can be 12 inches (~300 mm) in diameter. In this embodiment, cartridges 16 can be configured to have an outer diameter of approximately 12 inches (~300 mm) so as to slide into reactor chamber 19, and wherein passageway 33 can be configured to have a diameter of approximately 6 inches (~150 mm) so as to provide a roughly uniform interior diameter all through fluid reaction tank 10 from inlet 24 to outlet 26. In a representative embodiment, reactor housing 12 can comprise a length of approximately 97 inches wherein cartridges 16 can comprise a length of 15-13/16 inches such that up to six cartridges 16 can be placed in reactor chamber 19 although it is obvious to those skilled in the art that the dimensions of reactor housing 12 and cartridges 16, in addition to the number of cartridges 16, can be increased or decreased as necessary for the volume of fluid to be treated passing therethrough and the type and quantity of suspended solids to be removed therefrom.

In some embodiments, vortex tube 14 can comprises one or more vortex forming ridges 30 disposed within passageway 15 whereby fluid entering inlet 24 will begin to spin as it flows through vortex tube 14 thereby causing the fluid to exit vortex tube 24 and enter reactor housing 12 in a vortex motion. In some embodiments, ridges 30 can comprise a spiral-shaped member similar to that of a screw to induce a vortex motion in the fluid flowing therethrough. In some embodiments, ridges 30 can comprise two or more such spiral-shaped members in a helix configuration. In some embodiments, either or both of vortex tube 14 and housing 12 can further comprise one or more injection ports 42 for injecting chemicals into the fluid, such as chemicals to adjust the pH of the fluid, in addition to injecting gases or liquid coagulants or flocculants therein that work in conjunction with composition 36 disposed in cartridges 16. In some embodiments, housing 12 can further comprise combination forklift lifting straps/lifting hooks 44 configured to receive the forks of a forklift or lifting chain for lifting and moving fluid reaction 10.

Figure 8:
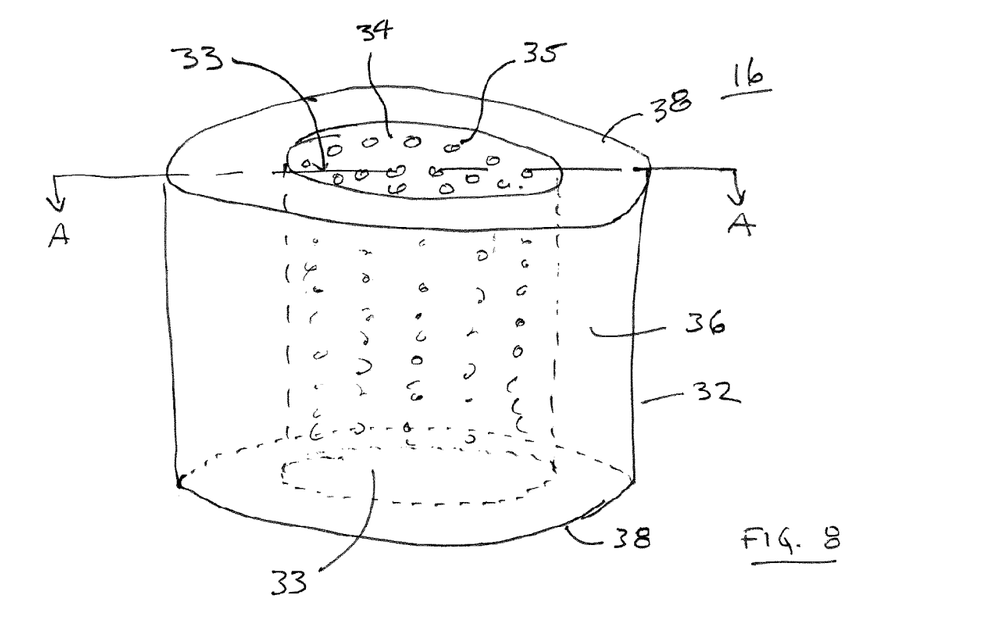
FIG. 8 is a perspective view depicting the cartridge of FIG. 6.

In some embodiments, reactor housing 12 can comprise at least one cartridge 16 disposed in reactor chamber 19. Each cartridge 16 can comprise a cylindrical outer sidewall 32 and a cylindrical inner sidewall 34 disposed concentrically within outer sidewall 32. Disposed between outer and inner sidewalls 32 and 34 can be composition 36, wherein composition 36 can comprise the flocculant discussed above. When composition 36 is solid or gelatinous, composition 36 can operate or function as an "annular spacer" between outer and inner sidewalls 32 and 34. In some embodiments, outer and inner sidewalls 32 and 34 can be spaced approximately 1.5 inches apart. In some embodiments, cartridge 16 can comprise one or two end walls 38 to couple outer and inner sidewalls 32 and 34 together.

Figure 9:
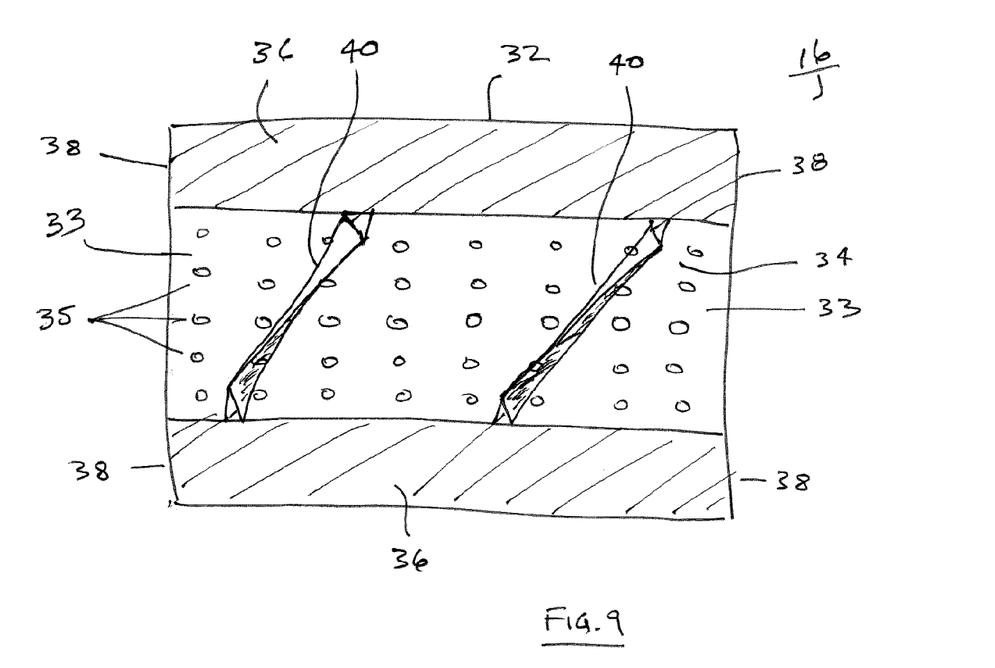
FIG. 9 is a cross-section side elevation view depicting an embodiment of the cartridge of FIG. 8 along section lines A-A, the cartridge further comprising vortex ridges therein.

In some embodiments, inner sidewall 34 can comprise a plurality of perforations 35 disposed therethrough to enable communication of fluid in passageway 33 with composition 36. In some embodiments, inner sidewall 34 can further comprise one or more vortex forming ridges 40 disposed thereon to further impart or to maintain the vortex motion on the fluid flowing therethrough. In some embodiments, ridges 40 can comprise a spiral-shaped member similar to that of a screw to induce a vortex motion in the fluid flowing therethrough. In some embodiments, ridges 40 can comprise two or more such spiral-shaped members in a helix configuration.

In some embodiments, the diameter of cartridge 16 can be selected to slidably fit within reactor chamber 19. In some embodiments, a plurality of cartridges 16 can be disposed within reactor chamber 19. In a representative embodiment, reactor chamber 19 can comprise six cartridges 16. In some embodiments, all of the cartridges can comprise the same flocculant composition whereas in other embodiments, different cartridges can comprise different formulations of the flocculant composition, the selection of which is dependent, inter alia, on the fluids being processed and the suspended solids to be removed therefrom.

In operation, fluid reaction tank 10 can provide a passive treatment to remove total suspended solids from a number of sources of fluids including, but not limited to, water and fluid run-off from mining operations, water and fluid used in any industrial process operation, stormwater, treatment of water used by and supplied by municipalities as well as water and fluids at construction sites. In some embodiments, fluid reaction tank 10 can flocculate total suspended solids from fluids flowing therethough for easy removal therefrom. In a representative embodiment, fluid reaction tank 10 can comprise 6" MNPT, schedule 10 fittings or 6" ANSI 150 flanges for inlet 24. In a representative embodiment, fluid reaction tank 10 can comprise 6" FNPT, schedule 10 fittings or 6" ANSI 150 flanges for outlet 26. In a representative embodiment, fluid reaction tank 10 can comprise a length of 137" without 6" ANSI 150 flanges, and a length of 138" with 6" ANSI 150 flanges. In a representative embodiment, fluid reaction tank 10 can comprise a width of 19" and a height of 22" to the top of combination forklift lifting straps/lifting hooks 44. In a representative embodiment, fluid reaction tank 10 can comprise a weight of 500 pounds.

In some embodiments, fluid reaction tank 10 can provide a flow-through reactor configured to release composition 36 into fluids flowing through reactor housing 12. Vortex tube 14 can impart a vortex motion to fluids flowing therethrough that can enable higher flow rates of fluids in a smaller physical footprint. Upon fluids contacting composition 36, solids suspended therein can aggregate as a result of the induced vortex motion in the fluids. In a representative embodiment, fluid reaction tank 10 can process a fluid flow rate of 400 to 1000 US gallons per minute.

Although a few embodiments have been shown and described, it will be appreciated by those skilled in the art that various changes and modifications can be made to these embodiments without changing or departing from their scope, intent or functionality. The terms and expressions used in the preceding specification have been used herein as terms of description and not of limitation, and there is no intention in the use of such terms and expressions of excluding equivalents of the features shown and described or portions thereof, it being recognized that the invention is defined and limited only by the claims that follow.

We claim:
1. A fluid reaction tank, comprising:
   a) a vortex tube comprising a first end and a second end, the first end comprising an inlet thereto, the vortex tube defining a first passageway disposed along a first longitudinal axis therethrough between the first and second ends and providing communication between the first and second ends, the vortex tube configured to impart a spinning vortex motion on fluid flowing therethrough from the first end to the second end;
   b) a reactor housing comprising a third end and a fourth end, the reactor housing defining a reactor chamber providing communication between the third and fourth ends, the reactor housing coaxially aligned with the vortex tube, the third end operatively coupled to the second end of the vortex tube wherein the fluid with the spinning vortex motion enters the third end from the second end, the fourth end defining an outlet therefrom; and c) at least one reactor cartridge disposed within the reactor chamber, the at least one reactor cartridge comprising an outer sidewall and an inner perforated sidewall, the at least one reactor cartridge comprising a second passageway extending therethrough, the at least one reactor cartridge comprising a composition disposed between the outer and inner sidewalls wherein the inner perforated sidewall is configured for the fluid to contact the composition, the composition comprising:
   i) a polymer flocculant comprising a high molecular weight, in a proportion of approximately 10% to 70% by weight,
   ii) a soluble salt of a group IA metal or a soluble salt of a group IIA metal, in a proportion of approximately 0.5% to 35% by weight, and
   iii) water, in a proportion to make up the balance of 100% weight.

2. The fluid reaction tank as set forth in claim 1, wherein the composition is solid or gelatinous.

3. The fluid reaction tank as set forth in claim 1, wherein the soluble salt is a combination of a salt of the group IA metal or a salt of the group IIA metal and an organic acid or a mineral acid.

4. The fluid reaction tank as set forth in claim 1, wherein the vortex tube is cylindrical.

5. The fluid reaction tank as set forth in claim 4, wherein the vortex tube further comprises at least one first vortex forming ridge disposed within the first passageway, wherein fluid entering the inlet and flowing through the first passageway exits the second end of the vortex tube in a vortex motion.

6. The fluid reaction tank as set forth in claim 1, wherein one or more of the first end, the second end, the third end and the fourth end comprises a mounting flange.

7. The fluid reaction tank as set forth in claim 6, wherein each of the second and third ends comprises one of the mounting flange, and wherein the second end is coupled to the third end via fasteners joining the mounting flanges together.

8. The fluid reaction tank as set forth in claim 1, wherein each of the outer sidewall and the inner sidewall of the at least one reactor cartridge is cylindrical, and wherein the composition is disposed between the outer and inner sidewalls.

9. The fluid reaction tank as set forth in claim 8, wherein the at least one reactor cartridge comprises at least one end wall coupling the outer sidewall to the inner sidewall.

10. The fluid reaction tank as set forth in claim 1, wherein the at least one reactor cartridge further comprises at least one second vortex forming ridge disposed within the second passageway, wherein fluid entering the third end and flowing through the second passageway exits the outlet in a vortex motion.

11. The fluid reaction tank as set forth in claim 1, wherein the reactor housing is cylindrical, and wherein the vortex tube is cylindrical.

12. The fluid reaction tank as set forth in claim 11, wherein the reactor housing is larger than the vortex tube.

13. The fluid reaction tank as set forth in claim 1, wherein one or both of the inlet and the outlet comprises pipe coupling threads.

14. The fluid reaction tank as set forth in claim 1, wherein one or both of the vortex tube and the reactor housing further comprises one or more injection ports for injecting chemicals therein.

15. The fluid reaction tank as set forth in claim 1, wherein the reactor housing comprises one or both of lifting hooks and forklift straps disposed thereon.

16. A method for treating fluid to remove suspended solids therefrom, the method comprising passing the fluid through a fluid reaction tank, the fluid reaction tank comprising:

a) a vortex tube comprising a first end and a second end, the first end comprising an inlet thereto, the vortex tube defining a first passageway disposed along a first longitudinal axis therethrough between the first and second ends and providing communication between the first and second ends, the vortex tube configured to impart a spinning vortex motion on fluid flowing therethrough from the first end to the second end;

b) a reactor housing comprising a third end and a fourth end, the reactor housing defining a reactor chamber providing communication between the third and fourth ends, the reactor housing coaxially aligned with the vortex tube, the third end operatively coupled to the second end of the vortex tube wherein the fluid with the spinning vortex motion enters the third end from the second end, the fourth end defining an outlet therefrom; and c) at least one reactor cartridge disposed within the reactor chamber, the at least one reactor cartridge comprising an outer sidewall and an inner perforated sidewall, the at least one reactor cartridge comprising a second passageway extending therethrough, the at least one reactor cartridge comprising a composition disposed between the outer and inner sidewalls wherein the inner perforated sidewall is configured for the fluid to contact the composition, the composition comprising:
   i) a polymer flocculant comprising a high molecular weight, in a proportion of approximately 10% to 70% by weight,
   ii) a soluble salt of a group IA metal or a soluble salt of a group IIA metal, in a proportion of approximately 0.5% to 35% by weight, and
   iii) water, in a proportion to make up the balance of 100% weight.

17. The method as set forth in claim 16, wherein the composition is solid or gelatinous.

18. The method as set forth in claim 16, wherein the soluble salt is a combination of a salt of the group IA metal or a salt of the group IIA metal and an organic acid or a mineral acid.

19. The method as set forth in claim 16, wherein the vortex tube is cylindrical.

20. The method as set forth in claim 19, wherein the vortex tube further comprises at least one first vortex forming ridge disposed within the first passageway, wherein fluid entering the inlet and flowing through the first passageway exits the second end of the vortex tube in a vortex motion.

21. The method as set forth in claim 16, wherein each of the outer sidewall and the inner sidewall of the at least one reactor cartridge is cylindrical, and wherein the composition is disposed between the outer and inner sidewalls.

22. The method as set forth in claim 21, wherein the at least one reactor cartridge comprises at least one end wall coupling the outer sidewall to the inner sidewall.

23. The method as set forth in claim 16, wherein the at least one reactor cartridge further comprises at least one second vortex forming ridge disposed within the second passageway, wherein fluid entering the third end and flowing through the second passageway exits the outlet in a vortex motion.

24. The method as set forth in claim 16, wherein one or both of the vortex tube and the reactor housing further comprises one or more injection ports for injecting chemicals therein.

\* \* \* \* \*